US009552721B2

(12) United States Patent
Feng et al.

(10) Patent No.: US 9,552,721 B2
(45) Date of Patent: Jan. 24, 2017

(54) SYSTEM AND METHOD FOR PROVIDING WIRELESS CONTROL ON AN ELECTRONIC DEVICE

(75) Inventors: Lei Feng, Shanghai (CN); Zhigang Chen, Xian (CN); Daiqin Yang, Singapore (SG)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 799 days.

(21) Appl. No.: 13/130,470

(22) PCT Filed: Nov. 19, 2009

(86) PCT No.: PCT/IB2009/055156
§ 371 (c)(1),
(2), (4) Date: Jul. 27, 2011

(87) PCT Pub. No.: WO2010/061317
PCT Pub. Date: Jun. 3, 2010

(65) Prior Publication Data

US 2011/0285514 A1 Nov. 24, 2011

(30) Foreign Application Priority Data

Nov. 26, 2008 (CN) .......................... 2008 1 0178736

(51) Int. Cl.
*H04Q 5/22* (2006.01)
*G08C 19/16* (2006.01)
(Continued)

(52) U.S. Cl.
CPC ........... *G08C 17/02* (2013.01); *G08C 2201/12* (2013.01)

(58) Field of Classification Search
CPC .. G06K 19/0723; G06K 7/0008; G08C 17/02; H04W 12/06; H01H 9/061; H02J 7/025
(Continued)

(56) References Cited

U.S. PATENT DOCUMENTS 5,157,709 A * 10/1992 Ohteru .................. H04W 16/10 370/329
5,237,264 A * 8/1993 Moseley et al. .............. 323/324
(Continued)

FOREIGN PATENT DOCUMENTS

JP 2002218679 A 8/2002
WO 2006129227 A2 12/2006
WO 2007110791 A1 10/2007

*Primary Examiner* — George Bugg
*Assistant Examiner* — Munear Akki
(74) *Attorney, Agent, or Firm* — Meenakshy Chakravorty

(57) ABSTRACT

The invention provides a system 100 for providing wireless control on an electronic device 30. The system 100 comprises a control station 10 and a wireless device 20. The control station 10 is configured to send a wireless exciting signal and a wireless control command. The wireless device 20 comprises an exciter module 201 and a processor module 210, wherein the exciter module 201 is configured to collect power from the wireless exciting signal and subsequently change a state of the processor module 210 from an inactive state to an active state, and the processor module 210 is configured to receive the control command and adjust functions of the electronic device 30 in accordance with the control command. The invention also provides a method and a wireless device.

12 Claims, 3 Drawing Sheets

(51) Int. Cl.
*G05B 19/00* (2006.01)
*H01H 47/00* (2006.01)
*H02J 7/14* (2006.01)
*G08C 17/02* (2006.01)

(58) Field of Classification Search
USPC ...................... 340/10.34, 12.5, 5.74, 825.72, 10.33,340/10.1; 307/126; 320/108
See application file for complete search history.

(56) References Cited

U.S. PATENT DOCUMENTS 5,637,964 A * 6/1997 Hakkarainen et al. ....... 315/295
5,729,590 A * 3/1998 Dimitriadis ......... H04W 84/025 340/7.22
5,987,205 A * 11/1999 Moseley et al. .............. 385/125
6,044,359 A * 3/2000 Goodwin, III .......... G06F 3/147 235/383
6,525,648 B1 * 2/2003 Kubler et al. ............. 340/10.33
7,019,617 B2 * 3/2006 Pratt et al. .................... 340/10.1
7,498,952 B2 * 3/2009 Newman, Jr. ............ 340/815.45
7,898,105 B2 * 3/2011 Greene et al. .................. 307/18
2002/0017981 A1 * 2/2002 Turner ................. G06K 7/0008 340/10.34
2005/0024187 A1 * 2/2005 Kranz ................ G06K 19/0707 340/10.33
2005/0093374 A1 5/2005 Connors et al.
2006/0012489 A1 * 1/2006 Yokota ................... G08C 17/02 340/13.25
2006/0215345 A1 9/2006 Huizenga
2008/0055092 A1 * 3/2008 Burr ........................... 340/572.7
2008/0084729 A1 4/2008 Cho et al.
2008/0100423 A1 * 5/2008 Geissler ............. G06K 19/0707 340/10.1
2008/0252478 A1 * 10/2008 Katsuyama ............ G08C 17/02 340/4.3

* cited by examiner

SYSTEM AND METHOD FOR PROVIDING WIRELESS CONTROL ON AN ELECTRONIC DEVICE

FIELD OF THE INVENTION

The present invention relates in general to a system and method for providing control on an electronic device, more specifically to a system and method for providing low-power wireless control on such a device.

BACKGROUND OF THE INVENTION

With the rapid progress of wireless technologies and the huge requirements imposed on intelligent control, more and more control systems choose wireless connection as a method of transferring control commands. Such systems are referred to as wireless control systems. For example, centrally controlled illumination networks employing a wireless connection are widely used, and a wireless control system allows a user to wirelessly control the illumination networks for displaying different illumination profiles. However, to make sure that the illumination networks receive wireless control commands and act promptly, wireless devices in the illumination networks need to be permanently active or wake up periodically so as to detect whether a command is received or not received. For example, if a light source in the above-mentioned centrally controlled illumination networks needs to respond to a user's command within one second, its corresponding wireless device must wake up every second. Usually, a wireless device of the wireless control system does not get any command during its wake-up period. Consequently, such illumination networks are less effective in terms of energy.

SUMMARY OF THE INVENTION

In order to overcome the above-mentioned deficiency, a system and method for providing low-power wireless control on an electronic device are provided.

In accordance with one aspect of the present invention, a method of providing wireless control on an electronic device is provided. This method comprises the steps of: supplying a wireless exciting signal to an exciter module; the exciter module collecting power from the wireless exciting signal; upon the exciter module collecting power to a pre-set level, changing a state of a processor module from an inactive state to an active state by means of the exciter module; supplying a wireless control command to the processor module when it is in its active state; and adjusting functions of the electronic device by means of the processor module in accordance with the wireless control command.

In accordance with another aspect of the present invention, a wireless device is provided, which comprises an exciter module and a processor module. The exciter module is configured to collect power from a wireless exciting signal and subsequently change a state of the processor module from an inactive to an active state, and the processor module is configured to receive a control command and adjust functions of an electronic device in accordance with the received control command.

In accordance with yet another aspect of the present invention, a system for providing wireless control on an electronic device is provided. The system comprises a control station and a wireless device. The control station is configured to send a wireless exciting signal and a wireless control command to the wireless device which comprises an exciter module and a processor module, wherein the exciter module is configured to collect power from the wireless exciting signal and subsequently change a state of the processor module from an inactive state to an active state. The processor module is configured to receive the control command and adjust functions of the electronic device in accordance with the received control commands.

When the device, system and method according to the invention are used, the processor module of the wireless device is active only when the control command is planned to be sent and is actually being sent, and the exciter module collects the power from the wireless exciting signal. Consequently, the energy consumption can be significantly reduced because the processor module is turned off or in a sleep state when there is no control command to be handled. Moreover, no meaningless polling is necessarily needed, which is necessary for a processor module of a wireless device in the prior art because such a module should periodically enable itself or another module to detect control commands.

BRIEF DESCRIPTION OF THE DRAWINGS

The above and other objects and features of the present invention are apparent from the following detailed description of various embodiments with reference to the accompanying drawings, in which.

DESCRIPTION OF EMBODIMENTS

Figure 1:
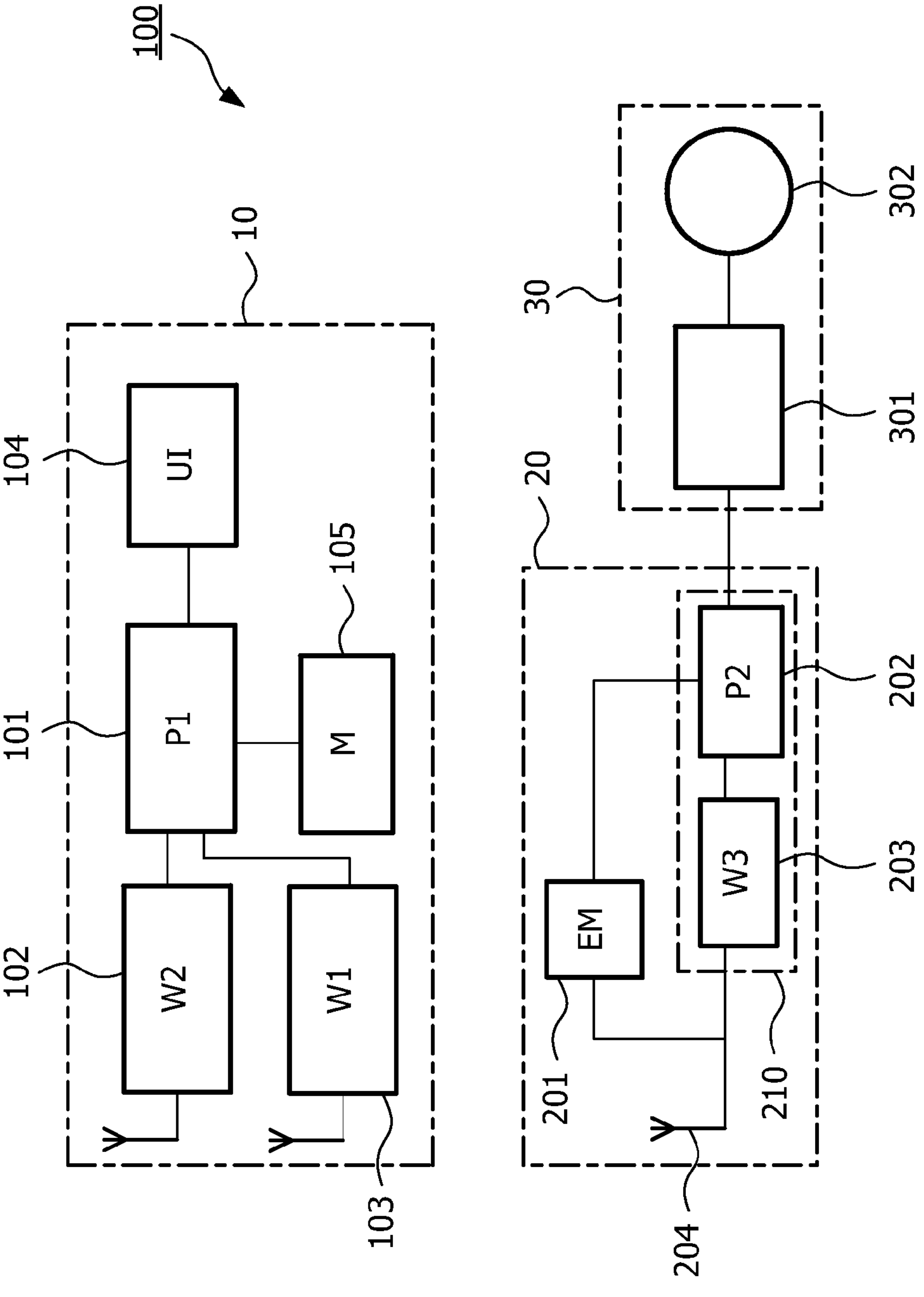
FIG. 1 is a schematic diagram of the system according to the invention.

FIG. 1 shows a system 100 for providing wireless control on an electronic device 30 according to an embodiment of the present invention. The system 100 comprises a control station 10, a wireless device 20 and the electronic device 30. The system 100 is adapted to employ the control station 10 and the wireless device 20 so as to wirelessly control the electronic device 30, namely, adjust functions of the electronic device 30, for example, control it to be turned on or off, or to perform a certain function.

The control station 10 includes a first processor (P1) 101, a first wireless module (W1) 102, a second wireless module (W2) 103, a user interface (UI) 104 and/or a memory (M) 105. The first processor 101 receives control commands via the user interface 104 from a user or from the local memory 105 in which the control commands are stored in advance. If the electronic device 30 is, for example, a LED lamp, the control commands may be requests to dim down/up or to change the color of the light emitted from the LED lamp, or to turn it on or off. The first processor 101 sends the control commands to the wireless device 20 via the first wireless module 102. The first processor 101 is also configured to generate an exciting signal to be sent to the wireless device 20 via the second wireless module 103 before the first processor 101 sends the control commands. Alternatively, the exciting signal is a radio-frequency signal. In some embodiments, the exciting signal may be a dummy radio-frequency signal without any meaningful information. In some other embodiments, the exciting signal may comprise some meaningful information, for example, a polling message. The function of the exciting signal will be described hereinafter.

Alternatively, the first and the second wireless module 102,103 may be combined into one module, which means that both the control command and the exciting signal can be sent via a single wireless module.

The wireless device 20 comprises an exciter module (EM) 201 and a processor module 210 which comprises a second processor (P2) 202 and a third wireless module (W3) 203. The exciter module 201 is configured to attain power from the incoming exciting signal coming from the first processor 101 of the control station 10 via the second wireless module 103. The exciter module 201 attains power via its receiving antenna 204 which may induce an electric current from its received exciting signal. The exciter module 201 is further configured to change a state of the second processor 202 from an inactive state to an active state, when exciter module 201 collects enough power. For example, in one embodiment, the exciter module 201 may turn on the second processor 202, resulting in the second processor 202 entering from a power-off mode into a power-on mode. Alternatively, in another embodiment, the exciter module 201 may generate an interrupt signal applied to the second processor 202 so as to wake it up from a sleep mode.

Once the second processor 202 enters into the active state, it will enable the third wireless module 203 to detect and receive the control command coming from the first processor 101 of the control station 10 and being sent via the first wireless module 102. When the third wireless module 203 receives the control command, it transmits the control command to the second processor 202. The second processor 202 analyzes the received control command and further outputs a control signal based on the control command to the electronic device 30.

As shown in FIG. 1, the third wireless module 203 shares the receiving antenna 204 with the exciter module 201 and they can operate in the same frequency band. Alternatively, the exciter module 201 may also use a unique frequency band and have a stand-alone receiving antenna.

Alternatively, the electronic device 30 may comprise a driving circuit 301 and a main body 302. The driving circuit 301 is adapted to operate under the control of the control signal from the second processor 202 so as to drive the main body 302 for implementing various functions.

Alternatively, the electronic device 30 may be a lighting device, for example, an incandescent lamp, or a fluorescent lamp such as a HID lamp, or a solid-state lighting device such as a LED lamp, or a combination of various lamps. The wireless control on the lighting device involves, for example, turning on/off, and adjusting brightness and/or color of lights emitted from the lighting device.

The electronic device 30 may also be a consumer electronic product, such as a TV, an electric cooker, or the like. It may also be a wireless implantable health-monitoring device. As for a TV, the wireless control involves, for example, turning on/off, changing channels, adjusting brightness of the image, etc.

Let it be assumed that a lighting device is selected as the electronic device 30. The lighting device 30 may comprise a driving circuit 301 and a light source 302. The driving circuit 301 is adapted to operate under the control of the control signal from the second processor 202 and to supply controllable power from a power supply (not shown) to the light source 302. The lighting device 30 can thus be controlled to emit a different brightness or color of light in accordance with the control command from the control station 10.

Alternatively, the system 100 may comprise a plurality of wireless devices 20 and a plurality of electronic devices 30. Each wireless device 20 is configured to wirelessly receive control commands from the control station 10 and subsequently control its corresponding electronic device 30. A wirelessly controlled electronic device network is thus formed, which allows a user to wirelessly control a plurality of electronic devices 30 simultaneously, for example, a plurality of LEDs contained in a wirelessly controlled illumination network so as to simultaneously display various illumination profiles.

Figure 2:
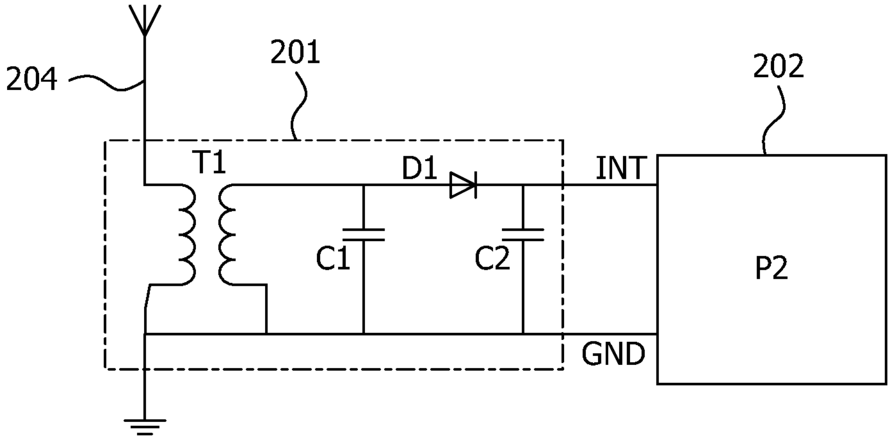
FIG. 2 shows a first embodiment of an exciter module of the system according to the invention.

FIG. 2 shows an embodiment of the exciter module 201 of the system 100 according to the invention. In the exciter module 201, an energy-harvesting unit comprising a transformer T1 and a capacitor C1 is employed and connected to the receiving antenna 204. The primary winding of the transformer T1 is connected to the receiving antenna 204, while the secondary wind of the transformer T1 is connected to the capacitor C1. Together with the secondary winding of T1, the capacitor C1 functions as a highly selective band-pass filter and is used to have the energy-harvesting unit detect and receive only a carrier frequency of the exciting signal. Consequently, an alternating-polarity voltage will be produced from output terminals of the energy-harvesting unit.

In other embodiments, the energy-harvesting unit can be configured to have a different specific topology as long as it has the energy-harvesting function, which may be proverbially used in a passive radio-frequency identification (RFID) tag receiving the power wirelessly from a RFID reader.

The processor module 210 comprising the second processor 202 and the third wireless module 203 are designed to be in a sleep mode if no control command needs to be received and processed by the wireless device 20. Except for the energy-harvesting unit, the exciter module 201 is therefore configured to further comprise an interrupt generation unit for generating an interrupt signal so as to wake up the processor module 210 from the sleep mode.

Alternatively, the interrupt generation unit comprises a diode D1 and a capacitor C2. Currents produced from the alternating-polarity voltage first pass through the diode D1 which only conducts the current in one direction, and then the capacitor C2 is used to store the resulting current and smooth out fluctuations from its output current. The output voltage from the capacitor C2 is used as an interrupt signal to be fed to the second processor 202 via an external interrupt pin (INT) of the second processor 202.

Once the harvesting module of the exciter module 201 collects enough power/energy to a preset level, the output voltage from the capacitor C2 is at a relatively high level. Accordingly, the external interrupt pin (INT) of the second processor 202 is set high. Consequently, the second processor 202 is triggered to be active and able to respond to the control station 10.

Alternatively, the control station 10 may send a polling message to the second processor 202 via the third wireless module 203 and its receiving antenna before it sends the control command. In some embodiments, the polling message may be embedded in the exciting signal. If the polling message requests the second processor 202 to receive a control command, the second processor 202 will return an acknowledge message once it is ready to receive such a control command. Subsequently, the control station 10 and the wireless device 20 execute the normal control procedures. Otherwise, the second processor 202 and the wireless module 203 return to the sleep mode directly.

When all control procedures are finished, the second processor 202 and the wireless module 203 go back to the sleep mode for power-saving purposes. Alternatively, the control station 10 may send an auxiliary command to request the second processor 202 and the wireless module 203 to return to the sleep mode, or the control command includes such an auxiliary command to request the second processor 202 and the wireless module 203 to return to the sleep mode.

Figure 3:
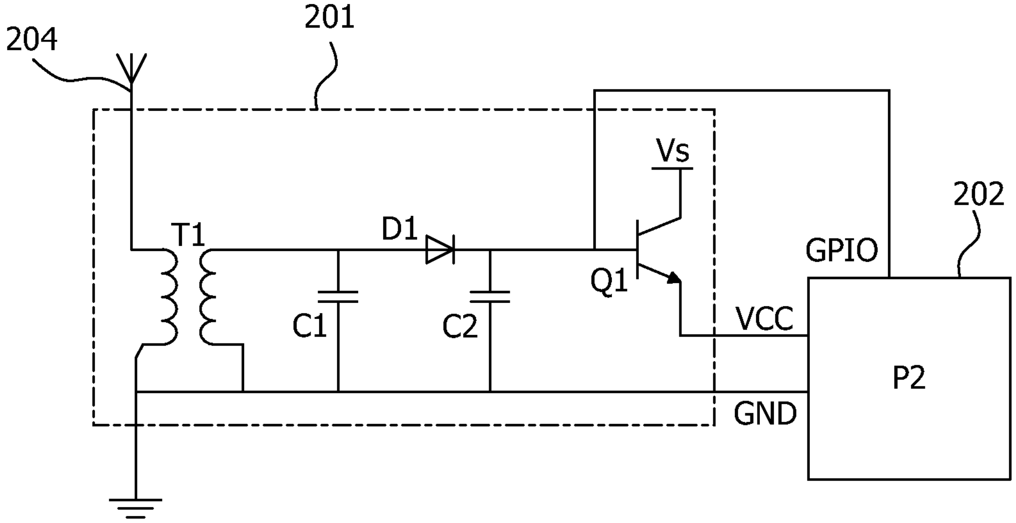
FIG. 3 shows a second embodiment of an exciter module of the system according to the invention.

FIG. 3 shows another embodiment of the exciter module 201 of the system 100 according to the invention. The processor module 210 comprising the second processor 202 and the third wireless module 203 are designed to be in a power-off mode if no control command needs to be received and processed by the wireless device 20. Except for the energy-harvesting unit, the exciter module 201 is therefore configured to further comprise an electronic switch unit for turning on/off the processor module 210. The energy-harvesting unit may be referred to by means of the foregoing description. The electronic switch unit comprises a diode D1, a capacitor C2 and an electronic switch Q1. The electronic switch Q1 operates at a voltage supplied by the capacitor C2. Alternatively, the electronic switch Q1 may be selected to be a transistor.

FIG. 3 shows an embodiment of the electronic switch Q1 as a transistor circuit. A general purpose input/output (GPIO) pin of the second processor 202 is connected to a base terminal of the transistor Q1. At the same time, the base terminal of the transistor Q1 is connected to an output terminal of capacitor C2, and the collector terminal of the transistor Q1 is connected to an external power supplier (Vs), while the emitter terminal of the transistor Q1 is connected to a power supply pin of the second processor 202. Once the energy-harvesting unit collects enough power to render the transistor Q1 conducting by means of the voltage supplied by the capacitor C2, the transistor Q1 will be turned on and, consequently, the external power supplier then supplies power to the second processor 202. Meanwhile, the second processor 202 sets this GPIO high so as to maintain the second processor 202 powered by the external power supplier, so that the transistor Q1 will keep the power of the second processor 202 without the exciting signal. The second processor 202 is thus turned on and switched in a power-on mode. Subsequently, the second processor 202 follows the same polling and acknowledgement procedures as described above. When all control procedures are finished, the second processor 202 shuts down completely. Accordingly, the processor module 210 of the wireless device 20 returns to its original state, namely, the power-off mode.

Figure 4:
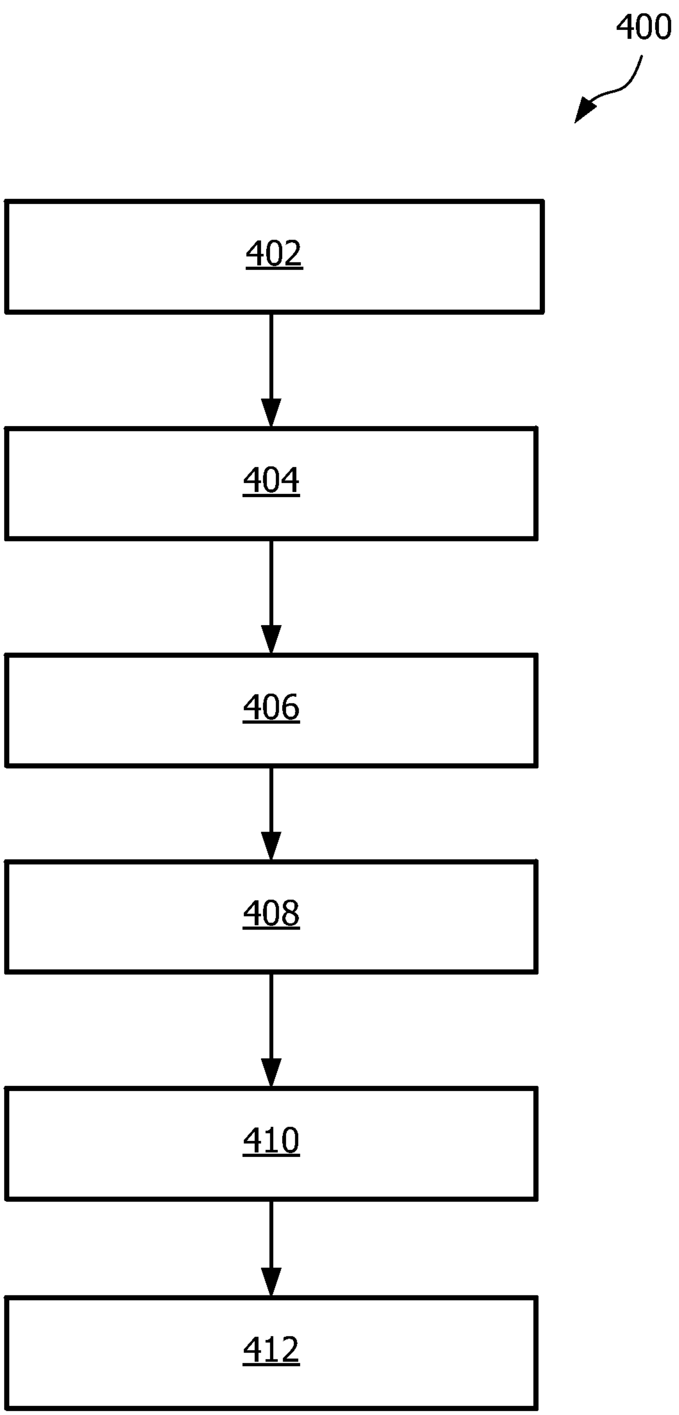
FIG. 4 is a flow chart of the method according to the invention.

FIG. 4 is a flow chart of a method 400 according to the invention. This method 400 is intended to provide wireless control on an electronic device and will now be described with reference to the system 100 described hereinbefore.

According to one embodiment, the method 400 includes a step 402 in which a wireless exciting signal is supplied by the control station 10 to the exciter module 201 of the wireless device 20. The method 400 also comprises a step 404 in which the exciter module 201 collects power from the wireless exciting signal. Once the exciter module 201 has acquired enough power, it will change the state of the processor module 210 (which comprises the second processor 202 and the third wireless module 203) of the wireless device 20 from an inactive state to an active state (step 406). When the processor module 210 is in its active state, the control station 10 will send a wireless control command to the processor module 210 which will receive the control command (step 408). The method 400 further includes a step 410 in which the processor module 210 adjusts functions of the electronic device 30 in accordance with the wireless control command.

In one embodiment, in step 404, the exciter module 201 receives power from electric currents induced in an antenna by the wireless exciting signal.

In one embodiment, in step 406, the exciter module 201 turns on the processor module 210 so that the processor module 210 is changed from a power-off mode to a power-on mode. In another embodiment, in step 406, the exciter module 201 supplies an interrupt signal so as to wake up the processor module 210 from a sleep mode.

In another embodiment, the electronic device includes a lighting device, and step 410 comprises adjusting brightness and/or color of light emitted from the lighting device.

In a further embodiment, the method also comprises a step 412 of the processor module 210 returning to its inactive state after it has fulfilled control on the electronic device 30 in accordance with the wireless control command.

The above-mentioned embodiments are merely preferred rather than limiting embodiments of the present invention. Other variants of the disclosed embodiments will be understood and effected by those skilled in the art in practicing the claimed invention, from a study of the drawings, the disclosure, and the appended claims. These variants should also be considered to be within the scope of the present invention. In the claims and description, use of the verb "comprise" and its conjugations does not exclude other elements or steps, and the indefinite article "a" or "an" does not exclude a plurality.

The invention claimed is:

1. A method of providing wireless control on an electronic device comprising an exciter module, a wireless command receiving module, and a processor module, said method comprising the steps of:

receiving, at the exciter module, a wireless exciting signal from a first wireless module of a control station, wherein the wireless exciting signal comprises a polling message;

collecting power from the wireless exciting signal at the exciter module, wherein the exciter module comprises a receiving antenna, a transformer, and a capacitor, a primary winding of the transformer coupled to the receiving antenna and a secondary winding of the transformer coupled to the capacitor;

upon the exciter module collecting power to a pre-set level, changing a state of a processor module from an inactive state to an active state and powering the wireless command receiving module with the collected power;

sending, once the processor module is powered, a wireless signal comprising an acknowledgement of the received polling message;

receiving, at the control station, the acknowledgement, wherein the acknowledgment indicates that the powered wireless command receiving module is ready to receive a wireless control signal comprising a wireless control command;

transmitting, by a second wireless module of the control station after the acknowledgement is received, a wireless control signal comprising a wireless control command and an auxiliary wireless control command directing the powered wireless command receiving module and the processor module to return to the inactive state after adjusting a function of the electronic device in accordance with the wireless control command;

receiving, at the powered wireless command receiving module, the wireless control signal comprising the wireless control command from the control station;

transmitting the wireless control command to the processor module; and adjusting a function of the electronic device in accordance with the wireless control command;

returning, based on the received auxiliary command, the wireless command receiving module and the processor module to the inactive state after adjusting the function of the electronic device in accordance with the wireless control command.

2. The method according to claim 1, wherein the step of changing the state of the processor module comprises turning on the processor module via the exciter module.

3. The method according to claim 1, wherein the step of changing the state of the processor module comprises supplying an interrupt signal so as to activate the processor module from a sleep mode, via the exciter module.

4. The method according to claim 1, wherein the electronic device is a lighting device and the step of adjusting comprises adjusting brightness and/or color of light emitted from the lighting device.

5. A wireless device comprising an exciter module, a wireless command receiving module, and a processor module, wherein the exciter module comprises a receiving antenna, a transformer, and a capacitor, a primary winding of the transformer coupled to the receiving antenna and a secondary winding of the transformer coupled to the capacitor, and wherein the exciter module is configured to collect power from a wireless exciting signal comprising a polling message and subsequently change a state of the processor module from an inactive state to an active state and to power the wireless command receiving module with the collected power, and further wherein the active processor is configured to cause the wireless device to send a wireless signal comprising an acknowledgement of the polling message, wherein the control station is configured to receive the acknowledgement and, after the acknowledgement is received, transmit a wireless control signal comprising a wireless control command and an auxiliary wireless control command directing the powered wireless command receiving module and the processor module to return to the inactive state after adjusting a function of the electronic device in accordance with the wireless control command, and further wherein the powered wireless command receiving module is configured to receive the wireless control signal comprising the control command and transmit the received control command to the processor module, and further wherein the processor module is configured to adjust a function of an electronic device in accordance with the received control command, and further wherein the processor module is configured to return to the inactive state after adjusting a function of the electronic device in accordance with the wireless control command.

6. The wireless device according to claim 5, wherein the exciter module is configured to supply the power to an electronic switch unit, said electronic switch unit being configured to turn on/off the processor module.

7. The wireless device according to claim 5, wherein the exciter module further comprises an interrupt generation unit, said interrupt generation unit being configured to generate an interrupt signal so as to wake up the processor module from a sleep mode.

8. A system for providing wireless control on an electronic device, said system comprising:

a control station configured to send a wireless exciting signal comprising a polling message, and further configured to send a wireless control command, wherein the control station is configured to send the wireless control command only if an acknowledgement of the polling message is received; and a wireless device comprising an exciter module, a wireless command receiving module, and a processor module, wherein the exciter module comprises a receiving antenna, a transformer, and a capacitor, a primary winding of the transformer coupled to the receiving antenna and a secondary winding of the transformer coupled to the capacitor, and wherein the exciter module is configured to collect power from the wireless exciting signal and subsequently change a state of the processor module from an inactive to an active state and to power the wireless command receiving module with the collected power, and further wherein the active processor is configured to cause the wireless device to send a wireless signal comprising the acknowledgement of the polling message, and further wherein the powered wireless command receiving module is configured to receive, from the control station, the sent wireless control signal comprising the control command and an auxiliary wireless control command directing the powered wireless command receiving module and the processor module to return to the inactive state after adjusting a function of the electronic device in accordance with the wireless control command, and further wherein the powered wireless command receiving module is configured to transmit the received control command to the processor module, and further wherein the processor module is configured to adjust a function of an electronic device in accordance with the received control command, and further wherein the processor module is configured to return to the inactive state after adjusting the function of the electronic device in accordance with the wireless control command.

9. The system according to claim 8, wherein the electronic device includes a lighting device and the processor module is configured to adjust brightness and/or color of light emitted from the lighting device.

10. The system according to claim 8, wherein the exciter module comprises an electronic switch unit configured to turn on/off the processor module.

11. The system according to claim 8, wherein the exciter module comprises an interrupt generation unit configured to generate an interrupt signal so as to wake up the processor module from a sleep mode.

12. The system according to claim 8, wherein the exciting signal is a radio-frequency signal.

* * * * *